United States Patent [19]
Matchefts et al.

[11] Patent Number: 6,128,656
[45] Date of Patent: Oct. 3, 2000

[54] SYSTEM FOR UPDATING SELECTED PART OF CONFIGURATION INFORMATION STORED IN A MEMORY OF A NETWORK ELEMENT DEPENDING ON STATUS OF RECEIVED STATE VARIABLE

[75] Inventors: Marco J. Matchefts; Robert C. Taylor; Ronald A. Pleshek, all of Austin, Tex.

[73] Assignee: Cisco Technology, Inc., San Jose, Calif.

[21] Appl. No.: 09/150,878

[22] Filed: Sep. 10, 1998

[51] Int. Cl.[7] .................................................. G06F 15/173
[52] U.S. Cl. ............................................. 709/223; 709/224
[58] Field of Search ..................................... 709/223, 224, 709/100; 710/103; 703/22

[56] References Cited

U.S. PATENT DOCUMENTS

| | | | |
|---|---|---|---|
| 5,210,530 | 5/1993 | Kammerer et al. | 340/825.08 |
| 5,471,617 | 11/1995 | Farrand et al. | 709/100 |
| 5,621,721 | 4/1997 | Vatuone | 370/16 |
| 5,678,006 | 10/1997 | Valizadeh et al. | 709/223 |
| 5,931,911 | 8/1999 | Remy et al. | 709/223 |
| 6,018,625 | 1/2000 | Hayball et al. | 703/22 |
| 6,058,445 | 5/2000 | Chari et al. | 710/103 |

*Primary Examiner*—Le Hein Luu
*Attorney, Agent, or Firm*—Baker Botts L.L.P.

[57] ABSTRACT

A system for updating a memory storing configuration information of a network element includes a network element and a network manager coupled to the network element using a communication network. The network manager receives selected configuration information from the network element to update a selected part of the memory if a received state variable does not match a stored state variable.

29 Claims, 7 Drawing Sheets

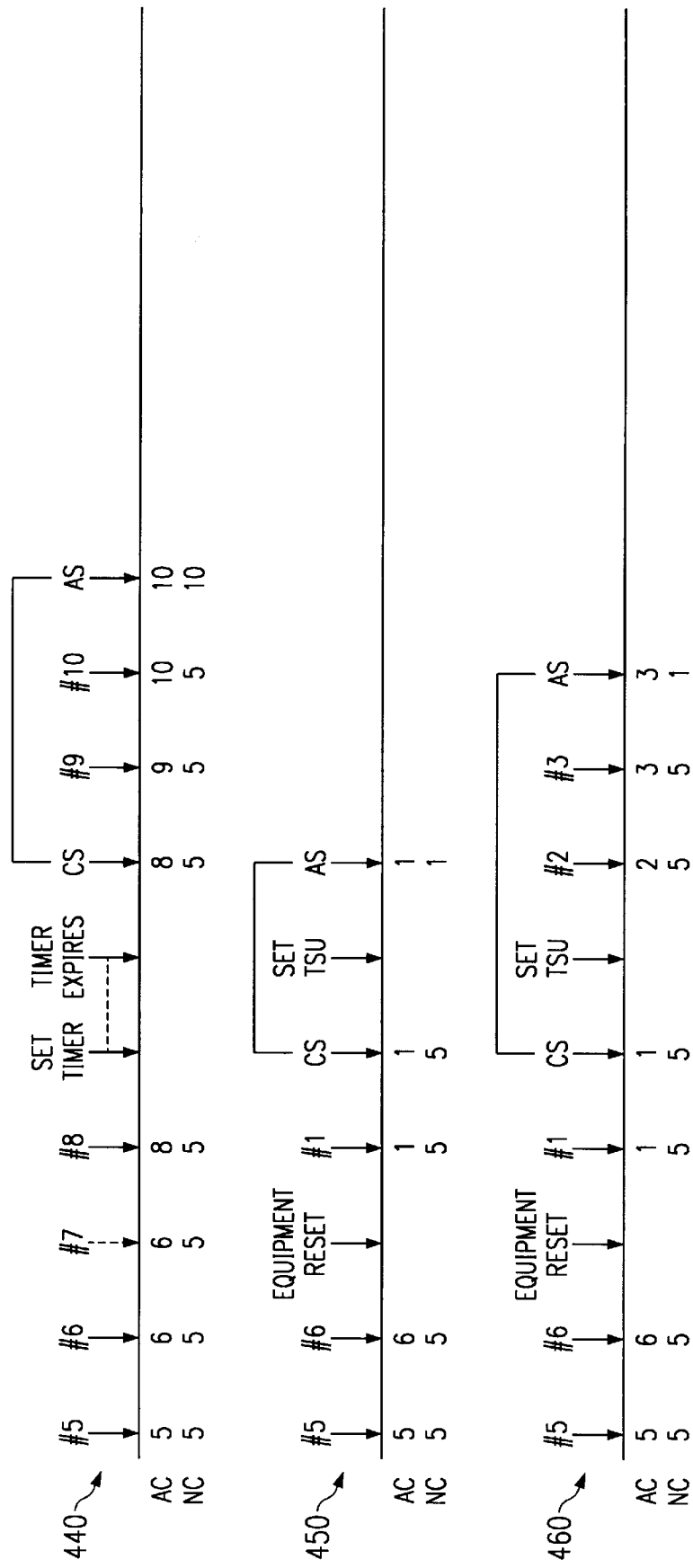

SYSTEM FOR UPDATING SELECTED PART OF CONFIGURATION INFORMATION STORED IN A MEMORY OF A NETWORK ELEMENT DEPENDING ON STATUS OF RECEIVED STATE VARIABLE

TECHNICAL FIELD OF THE INVENTION

This invention relates in general to network management systems and methods, and more particularly to a configuration synchronization system and method.

BACKGROUND OF THE INVENTION

Communication networks are ubiquitous in our society. The continuing development of new technologies and investment in new infrastructure increases the connectivity and availability of networks that deliver voice, video, and data services to more customers. This new infrastructure includes a variety of network elements that have become increasingly more complex and more dependent on their interaction with other components in the network. As such, communication service providers must coordinate the operation of network elements to provision reliable and effective communication services to their customers. Often, this coordination of network elements is performed by a collection of hardware and software known as a network management system.

Most network management systems include a network manager that manages and coordinates the operation of network elements in a communication network. The network manager allows the service provider to install, monitor, upgrade, and configure network elements to provide the desired communication services. To accomplish these tasks, the network manager accesses an accurate view or status of provisioned equipment in the field, often in the form of a Management Information Base (MIB). Timely access to accurate configuration information stored in the MIB is important to manage network elements.

SUMMARY OF THE INVENTION

In accordance with the present invention, a system and method for updating a memory storing configuration information of a network element is provided that substantially eliminates or reduces disadvantages or problems associated with previously developed network management systems and methods.

In one embodiment of the present invention, a system for updating a memory storing configuration information of a network element includes a network element that stores configuration information. A network manager coupled to the network element using a communication network stores a portion of the configuration information in memory. The network manager receives a state variable from the network element and compares the received state variable to a stored state variable. The network manager receives selected configuration information from the network element to update a selected part of the memory if the received state variable does not match the stored state variable.

Technical advantages of the present invention include a system and method that update a memory storing configuration information of a network element using one or more state variables retrieved from the network element. In a particular embodiment, a network management server maintains configuration information for a managed network element locally and provides access to the configuration information by one or more clients in a client/server environment. The server, clients, and managed network elements communicate messages (e.g., SNMP messages) over a management network, such as an Ethernet, an Asynchronous Transfer Mode (ATM) network, or any suitable communication network. To improve access to configuration information, the server maintains one or more caches of selected configuration information readily available to clients, as well as a persistent storage of full configuration information in a database.

Other technical advantages of the present invention include the ability to reconcile configuration information received in a variety of ways to maintain a consistent and accurate view of the managed network element. For example, the server may receive configuration information in the form of traps autonomously generated by the network element indicating an alarm condition, alarm clear, or module insertion event. The server may also poll the network element for configuration information or receive updates of the configuration information from a client managing the network element. Also, the server may be notified of changes in the network element configuration made by another network management device or system. The present invention manages all of this information to achieve a consistent and accurate view of the network element in both a cache of information immediately available to clients and a database.

Another particular advantage of the present invention is the ability to perform a partial update of configuration information maintained by the server by comparing retrieved checksums associated with data subsets of configuration information, and updating only those data subsets in which the checksums indicate an altered state. The server also includes processes that manage the processing of traps received from the network element. In a particular embodiment, the server identifies missed or out-of-sequence traps and, if necessary, reissues alarms to maintain the consistency of configuration information stored in the cache and database. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which:

FIGS. 8A and 8B illustrate a number of trap processing scenarios of the network management system.

DETAILED DESCRIPTION OF THE INVENTION

Figure 1:
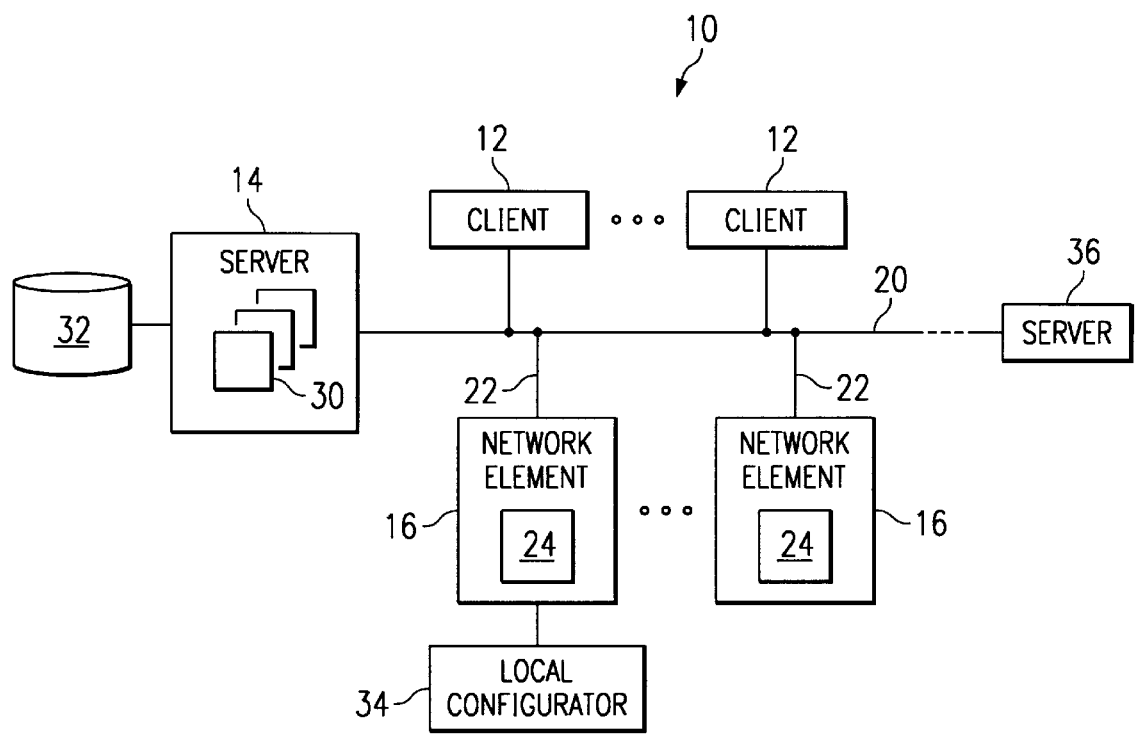
FIG. 1 illustrates a network management system constructed in accordance with the present invention.

FIG. 1 illustrates a network management system 10 that includes a number of clients 12 and one or more network managers or servers 14 that manage a variety of network elements 16. Generally, system 10 provides a number of network management services to install, monitor, upgrade, and configure network elements 16 to provision communication services to users. In a particular embodiment, system 10 accomplishes these tasks by maintaining accurate and readily accessible configuration information associated with network elements 16.

Network elements 16 managed by system 10 may include any variety of communication hardware and/or software to deliver a variety of voice, video, data, and other communication services to users. Network elements 16 may be portions of the Public Switched Telephone Network (PSTN), private or public data networks, a global communications network such as the Internet, other wireline or wireless networks, or any other local, regional, or global communication network. To perform its communication services, each network element 16 maintains and continually updates configuration information stored in a Management Information Base (MIB), database, or other suitable storage facility, generally referred to as MIB 24.

Each network element 16 couples to management network 20 using management links 22. Management network 20 may be a local area network (LAN), a wide area network (WAN), a public or private network, a global data network such as the Internet, a wireline or wireless network, or any other suitable communication network that provides communication among components in system 10. In a particular embodiment, management network 20 comprises an Ethernet that communicates network messages using, for example, Simple Network Management Protocol (SNMP), Remote Monitor Protocol (RMON), Transport Control Protocol/Internet Protocol (TCP/IP), or any other suitable messaging protocol.

MIB 24 arranges configuration information in variables, tables, files, or any other suitable arrangement, referred to generally as data subsets. Data subsets in MIB 24 are associated with hardware and/or software of network element 16. For example, data subsets may be associated with individual cards, racks, modules, or other resident components. Also, data subsets may include software tables or other data structures, such as alarm tables, module tables, and variable configuration tables. Configuration information as used in this description refers to any information maintained in MIB 24 either persistently or for a short period of time, and any communications from network elements 16 using management network 20. In a particular embodiment, MIB 24 names and arranges data subsets in a manner consistent with the MIB or MIB-II conventions that are well-known in the industry. MIB 24 may also maintain other information specific to network element 16 that is not part of the MIB conventions.

Server 14 in system 10 communicates with network element 16 using management network 20. Server 14 maintains at least portions of configuration information stored in MIB 24 for each managed network element 16 in a memory, which may include one or more selected caches 30 (referred to generally as cache 30) and one or more databases 32 (referred to generally as database 32). In a particular embodiment, cache 30 includes selected configuration information of network element 16 that is readily accessible to clients 12, whereas database 32 includes a complete and persistent copy of configuration information stored in MIB 24. Database 32 supports Standard Query Language (SQL), object-oriented operation, or any other suitable storage and retrieval scheme to allow components in system 10 to access stored configuration information of network element 16. One important aspect of system 10 is that server 14 maintains cache 30 to allow faster access to configuration information without performing queries to database 32.

Clients 12, also coupled to management network 20, allow service providers to monitor and manage network elements 16. In a particular embodiment, clients 12 perform management functions by accessing configuration information stored in cache 30 and/or database 32 maintained by server 14. For example, clients 12 may perform queries to cache 30 and/or database 32 to present a user with a current view or status of network element 16. Clients 12 may also provide a graphical user interface (GUI) that presents graphically the current state of network element 16, and allows users of client 12 to modify or set configuration information in network element 16. In a particular embodiment, client 12 may operate or interface with an application programming interface (API), such as CORBA, or other suitable external program to deliver network management functions.

In operation, server 14 runs a variety of software processes to communicate with network elements 16 and clients 12, and to maintain an accurate and consistent view of configuration information in both cache 30 and database 32. Configuration information in network element 16 can change for a variety of reasons. For example, network element 16 may issue messages, notifications, or other communications (generally referred to as traps) to indicate the status change of network element 16. In a particular embodiment, traps may be classified in the following categories: information, critical, major, minor, and clear. Also, instead of or in addition to classifications based on alarm severity, traps may also be classified based on alarm type or may include additional information on the specific alarm event. Informational traps may indicate module insertion events, software download status, configuration or synchronization status, or any other informational event or status of network element 16.

Each trap includes an object identifier that associates configuration information in MIB 24 with a module, slot, port or other component designation of network element 16. A trap also includes an event code, a timestamp, and a trap sequence number (TSN). During operation, network element 16 generates a number of traps indicating installation of new components, errors or alarms, or other condition resulting in the generation of a trap for communication to server 14. Due to congestion or limitations in network 20, downtime of components in system 10, or other reasons, server 14 may miss the communication of traps or receive traps out of sequence. In these instances server 14 must not only update its memory (e.g., cache 30 and database 32) with any received traps, but also reconcile its memory whenever traps are missed or received out of sequence.

Configuration information stored in MIB 24 may also change due to local or remote modification by other network management devices or systems. For example, a local configurator 34 may represent hardware and/or software that is integral to or separate from network element 16 that changes configuration information in MIB 24 locally. Also, other components such as an additional server 36 may communicate messages over management network 20 to change configuration information of network element 16. Normally, clients 12 communicate with network elements 16 through server 14, so any modification of configuration information by clients 12 should be captured and properly reflected at the memory maintained by server 14. However, when client 12, server 14, network element 16, network 20, or other components of system 10 fail or malfunction, consistency may be lost between configuration information in MIB 24 and the memory maintained by server 14.

Whether based on missed or out-of-sequence traps, local or remote modification to MIB 24, or complete or partial failure of components in system 10, there are a variety of scenarios in which server 14 must reconcile information maintained in its memory (e.g., cache 30 and database 32) to ensure a proper view and status of network elements 16. Traditionally, if there is a loss of consistency between MIB 24 and information stored in cache 30 and database 32, then server 14 initiates a full database reconciliation or synchronization to download all relevant configuration information stored in MIB 24 from network element 16. However, this operation may be slow and cumbersome, especially with significant traffic demands on a bandwidth-limited management network 20. This problem is further exacerbated by relatively crude messaging protocols (e.g., SNMP) that provide limited data integrity and lost message recovery mechanisms. Therefore, in one important aspect of the present invention, server 14 recovers from missed or out-of-sequence traps, as well as other configuration changes, without requiring a full reconciliation of cache 30 and database 32.

Figure 2:
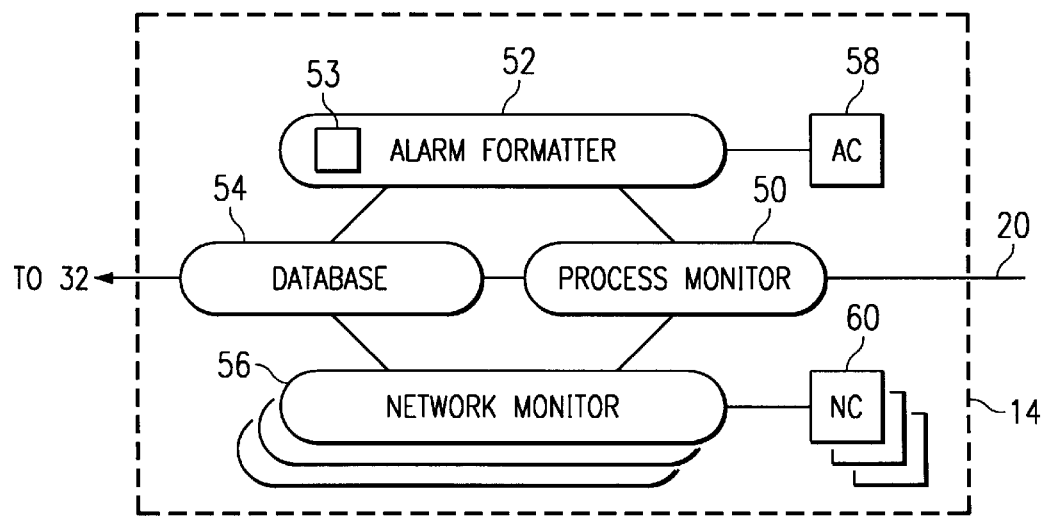
FIG. 2 illustrates in more detail the server in the network management system.

FIG. 2 illustrates in more detail modules of network manager or server 14. In a particular embodiment, server 14 comprises a Unix workstation and the modules represent separate processes spawned by the workstation to provide a variety of functions. In this particular embodiment, server 14 maintains a process monitor 50, an alarm formatter 52, a database module 54, and one or more network monitors 56. In this architecture, portions of cache 30 may be referred to as an alarm formatter cache (AC) 58 accessible by alarm formatter 52, and portions of cache 30 may be referred to as one or more network monitor caches (NC) 60 accessible by network monitors 56. It should be understood that server 14 may maintain cache 30 in any form or arrangement of files, tables, or other data structures. Also, server 14 contemplates any number and arrangement of modules to accomplish the various tasks of communicating with clients 12 and network elements 16, and maintaining the consistency of cache 30 and database 32. For example, portions of the tasks performed by process monitor 50, alarm formatter 52, database module 54, and network monitor 56 may be combined or rearranged in generally into a network interface and processor having related hardware and/or software components.

Process monitor 60 controls the operations of server 14 and may perform global management of a number of servers, such as server 36. Process monitor 50 acts as a conduit for messages passing between modules of server 14 and clients 12 or network elements 16. Process monitor 50 routes information received from management network 20 to the appropriate module in server 14. Similarly, process monitor 50 routes communications from modules in server 14 to the appropriate clients 12 and network elements 16.

Alarm formatter 52 receives traps generated by network elements 16. Alarm formatter 52 identifies each trap, notifies any interested clients 12 managing network element 16 that generated the trap, and archives the trap in database 32. Alarm formatter 52 also maintains AC 58 to provide expedited processing and notification of traps without the need to access database 32. As described below in more detail, alarm formatter 52 includes a missing trap timer 53 and maintains a missing trap list in AC 58 to recover from a missing or out-of-sequence trap event without requiring a full or partial database reconciliation.

Each network monitor 56 in server 14 communicates with one or more network elements 16. Network monitor 56 maintains selected configuration information of its managed network element 16 in NC 60 and synchronizes MIB 24 with cache 30 and database 32 of server 14. Network monitor 56 can request or poll for selected configuration information from network element 16 to perform its functions. For example, network monitor 56 may poll MIB 24 for certain state variables and checksums to decide whether to perform a configuration synchronization and, when a partial or full synchronization is indicated, poll for and retrieve contents of MIB 24 to reconcile cache 30 and/or database 32.

Database module 54 facilitates communication between other modules of server 14 and database 32. Specifically, database module 54 receives queries from process monitor 50, alarm formatter 52, or network monitor 56 and responds to those queries by communicating the desired information from database 32. Also, during the reconciliation or synchronization process, database module 54 receives updated configuration information of network element 16 through alarm formatter 52 and network monitor 56. Database module 54 also allows alarm formatter 52 and network monitor 56 to maintain the internal consistency between configuration information stored in database 32 and components of cache 30 (e.g., AC 58 and NC 60).

Figure 3:
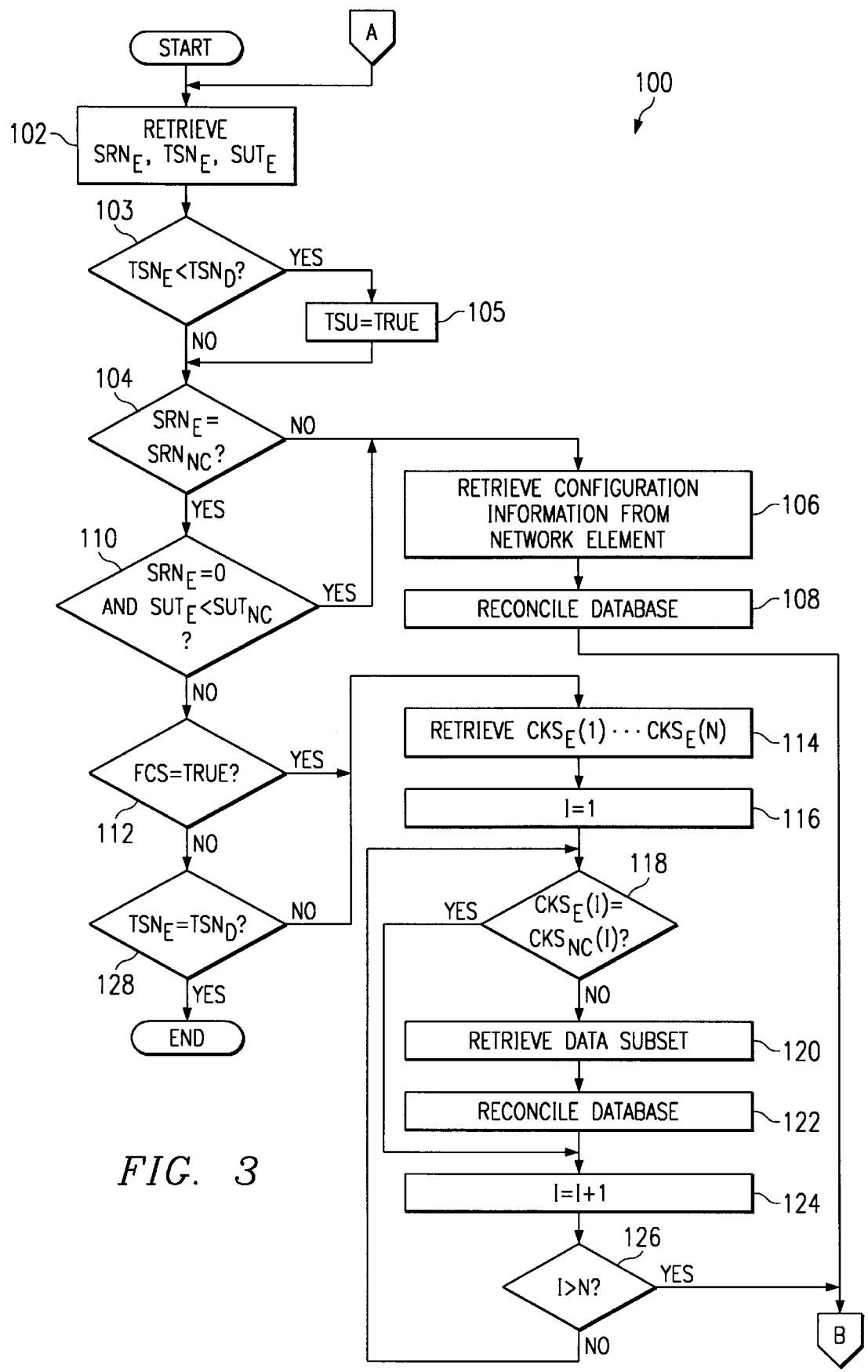
FIGS. 3 and 4 illustrate a flowchart of a method for synchronizing configuration information in the network management system.

In operation, alarm formatter 52 monitors traps generated by network element 16 and processes the traps with special attention to missing or out-of-sequence traps. When appropriate, network monitor 56 polls for configuration information stored in MIB 24 at network element 16, and communicates set requests or other commands to modify MIB 24. Set requests may be generated locally by server 14 or by client 12 to change configuration information maintained in network element 16. While receiving autonomously generated configuration information using alarm formatter 52 or through the generation and setting of configuration information using network monitors 56, server 14 invokes configuration and alarm synchronization processes to ensure cache 30 and database 32 are consistent and synchronized with configuration information stored in MIB 24. FIGS. 3 though 7 discuss these processes in more detail.

Figure 4:
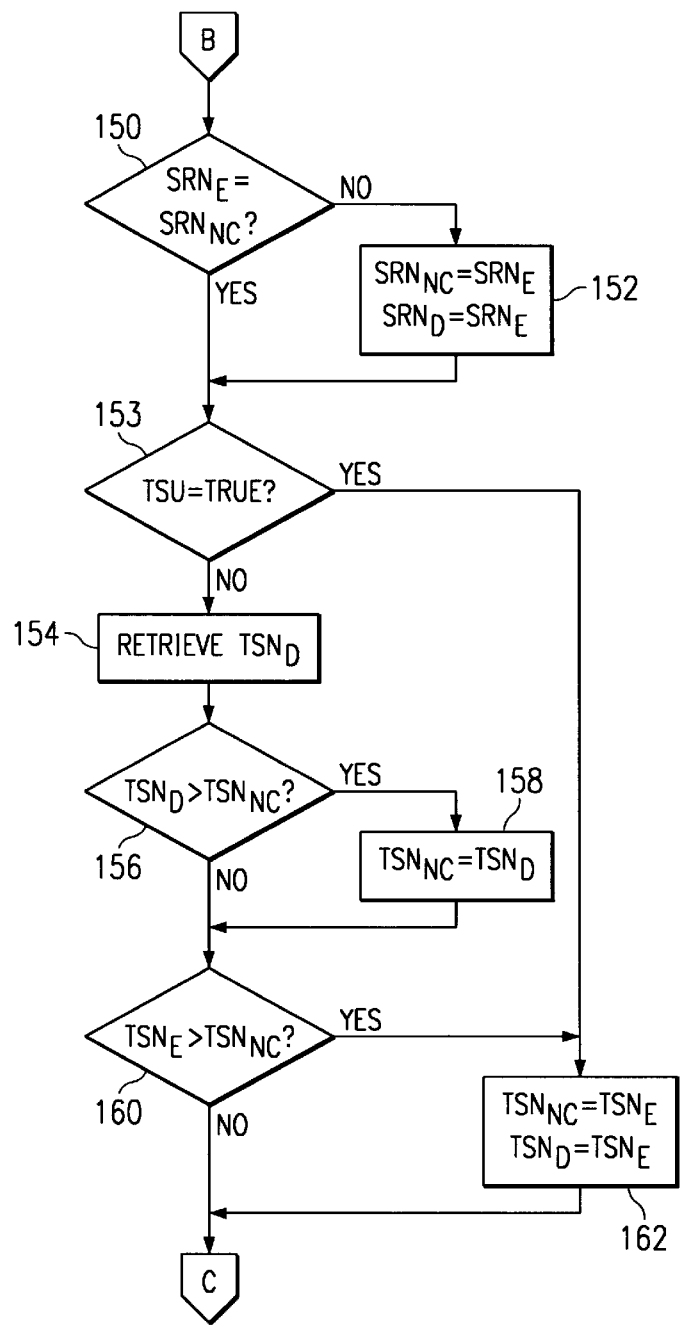

FIGS. 3 and 4 illustrate a flowchart of a method 100 performed by network monitor 56 for synchronizing the memory of server 14 (e.g., cache 30 and database 32) with MIB 24 of a particular network element 16. Method 100 may be invoked periodically (e.g., once a day, once a week), by an operator of client 12, or autonomously by network monitor 56 or alarm formatter 52. Method 100 begins at step 102 where network monitor 56 retrieves selected state variables stored in MIB 24 and represented by a subscript "E". In a particular embodiment, network monitor 56 retrieves a set request number ($SRN_E$), a trap sequence number ($TSN_E$), and system up-time ($SUT_E$) stored in MIB 24. The variable $SRN_E$ represents the number of set requests or requests to modify information stored in MIB 24. The variable $TSN_E$ represents the trap sequence number of the last trap communicated by network element 16. The variable $SUT_E$ indicates the amount of time that network element 16 has been operational since its last downtime, reboot, or other resetting event.

Although these specific MIB state variables are used in method 100, server 14 may use any appropriate state variable stored in MIB 24 to determine whether to perform a full or partial database reconciliation. In this manner, server 14 can make an intelligent decision of whether to perform a reconciliation based on the analysis of a few state variables. This provides the advantage of decreasing the traffic on management network 20, while still employing an algorithm that provides an accurate assessment of the consistency between MIB 24 and the memory of server 14 using selected state variables. In a particular embodiment, one state variable ($SRN_E$) enables server 14 to detect whether network element 16 has been "managed" or configured by local configurator 34, server 36, or some other device in system 10. If $SRN_E$ does not reconcile with information stored in database 32, then method 100 performs a full configuration synchronization. Another state variable ($TSN_E$) enables server 14 to detect a trap sequence mismatch and, in this case, perform a partial configuration synchronization. In this particular embodiment, server 14 utilizes a first state variable ($SRN_E$) to trigger a full configuration synchronization and a second state variable ($TSN_E$) to trigger a partial configuration synchronization.

Network monitor 56 determines whether $TSN_E$ is less than the trap sequence number stored in NC 60 ($TSN_{NC}$) at step 103, which would indicate a trap sequence reset or, more generally, a downtime, system reset, malfunction, or other failure at network element 16. If $TSN_E$ is less than $TSN_{NC}$, network monitor 56 sets a trap sequence update flag (TSU) to true at step 105. Network monitor 56 then compares $SRN_E$ to the set request number maintained in NC 60 ($SRN_{NC}$) at step 104. If these variables are not equal, then server 14 performs a full database reconciliation at steps 106 and 108. Network monitor 56 retrieves configuration information from MIB 24 at step 106 and reconciles database 32 at step 108. If $SRN_E$ equals $SRN_{NC}$, $SRN_E$ equals zero, and $SUT_E$, is less than the system up-time stored in NC 60 ($SUT_{NC}$), then server 14 again performs steps 106 and 108 to invoke a full database reconciliation. In a particular embodiment, step 108 to reconcile database 32 is performed as follows. Server 14 initially marks each configuration entry in database 32 for network element 16 as unclean, and traverses the variables configuration tables in MIB 24 to determine whether the configuration matches. If the configuration matches, the entry in database 32 is marked as clean. If the configuration differs, the value retrieved from MIB 24 is used to update the entry in database 32, which is then marked clean-updated. If there is no entry in MIB 24, the entry is left as unclean. When the process is complete, all unclean entries are deleted.

If either $SRN_E$ does not equal zero or $SUT_E$ is greater than or equal to $SUT_{NC}$, then network monitor 56 determines whether a forced configuration synchronization flag (FCS) is true at step 112. If FCS is true, then server 14 performs a partial database reconciliation at steps 114–126. To perform a partial database reconciliation, network monitor 56 retrieves checksums of data subsets stored in MIB 24, referred to as $CKS_E(1)$ to $CKS_E(N)$, at step 114. In this particular embodiment, N represents the number of data subsets maintained by network element 16 or subject to the configuration synchronization. Network monitor 56 then sets the counting index (I) equal to "1" at step 116. For each data subset, network monitor 56 determines whether $CKS_E$ equals the corresponding checksum stored in NC 60 ($CKS_{NC}$) at step 118. If the checksums do not match, then network monitor 56 retrieves the associated data subset from MIB 24 at step 120 and reconciles database 32 at step 122 using the retrieved data subset. The reconciliation of a data subset in step 122 may be performed in a similar manner as step 108 described above. Also, the reconciliation by data subsets described in steps 114–126 to perform partial database reconciliation may be similarly implemented and replace the full equipment database reconciliation of steps 106–108 in method 100. Upon performing the retrieval and reconciliation at steps 120 and 122 or if the checksums are equal, network monitor 56 increments the index at step 124, determines if it has cycled through each data subset at step 126 and, if not, repeats the checksum comparisons for the next data subset. If FCS is false, and $TSN_E$ does not equal the trap sequence number stored in database 32 ($TSN_D$), then network monitor 56 also performs a partial database reconciliation as described in steps 114–126.

After performing a full database reconciliation (steps 106–108), a partial database reconciliation (steps 106–108) or a partial database reconciliation (steps 114–126), method 100 continues with the steps in FIG. 4 to update cache 30 and database 32 with the retrieved state variables. Network monitor 56 determines whether $SRN_E$ equals $SRN_{NC}$ at step 150. If these variables are not equal, then server 14 sets both $SRN_{NC}$ and $SRN_D$ to the retrieved equipment value ($SRN_E$) at step 152. If the trap sequence update flag (TSU) is true at step 153, then network monitor 56 sets both $TSN_{NC}$ and $TSN_D$ to $TSN_E$ at step 162, and invokes an alarm synchronization performed by alarm formatter 52, as described in more detail with reference to FIG. 7.

If TSU is false at step 153, network monitor 56 then retrieves $TSN_D$ from database 32 at step 154 and determines whether $TSN_D$ is greater than $TSN_{NC}$ at step 156. If $TSN_D$ is greater than $TSN_{NC}$, then network monitor 56 sets $TSN_{NC}$ equal to $TSN_D$ at step 158. If $TSN_E$, is greater than $TSN_{NC}$ at step 160, then network monitor 56 sets both $TSN_{NC}$ and $TSN_D$ to $TSN_E$ at step 162. After updating state variables SRN and TSN in cache 30 and database 32, network monitor 56 invokes an alarm synchronization performed by alarm formatter 52, as described in more detail with reference to FIG. 7.

The above process describes a reconciliation of database 32 in step 108 as part of a full database reconciliation process and reconciliation of database 32 at step 122 on a data subset basis. Inherent in 108 and 122 is the logical internal reconciliation performed by server 14 to maintain consistency between database 32 and cache 30. Therefore, during or after reconciliation of database 32, server 14 also updates the contents of cache 30 to maintain consistency between cache 30 and database 32. This process may be performed in a similar manner as the reconciliation between database 32 and MIB 24, or using any other suitable database reconcilation process.

The maintenance of the integrity of cache 30 to reflect information maintained persistently in database 32 may also be done by a separate process that periodically marks entries in cache 30 as valid or invalid, retrieves updated information from database 32, and performs suitable housekeeping functions to remove or update invalid values from cache 30.

Figure 5:
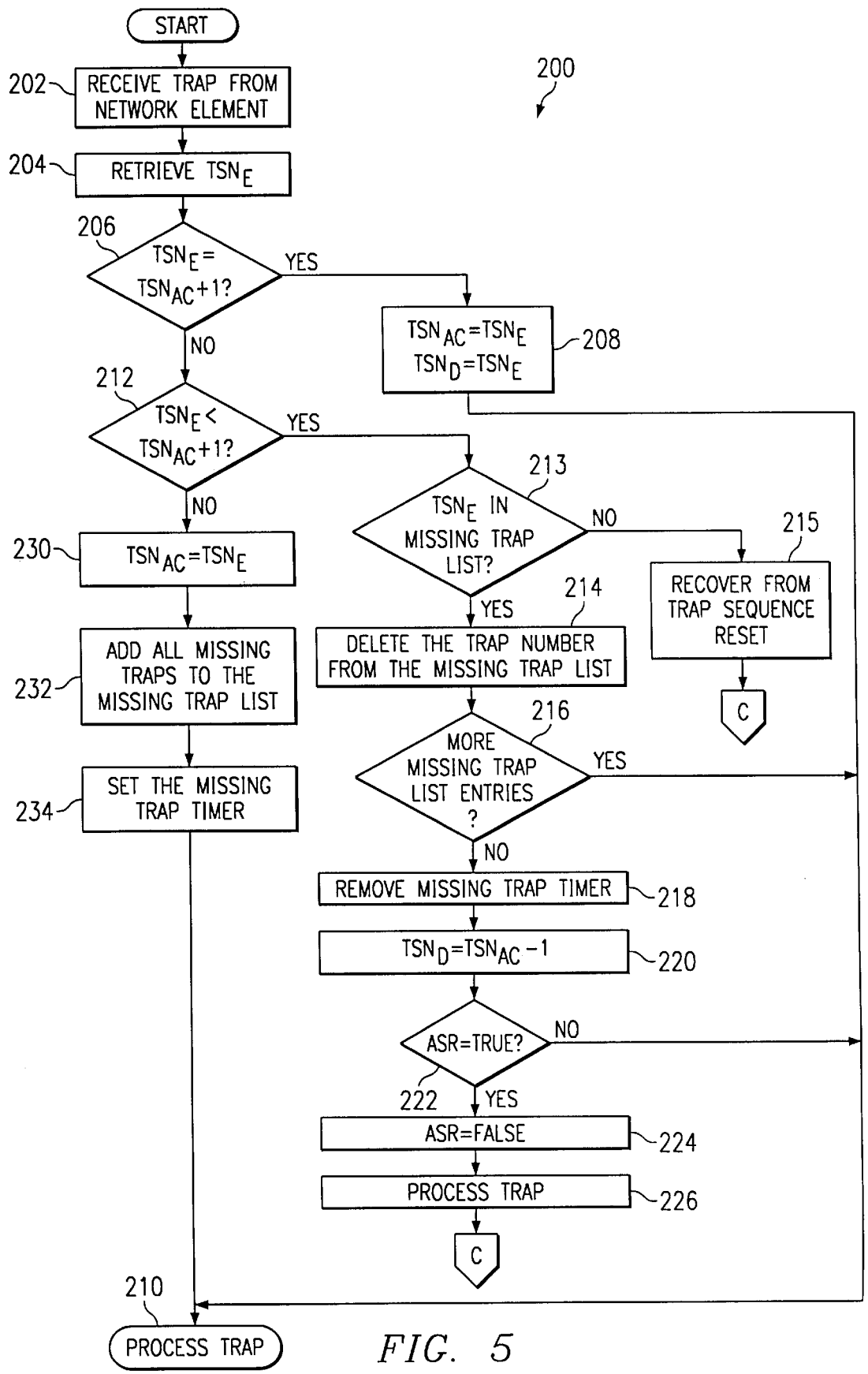

FIG. 5 illustrates a method 200 performed by alarm formatter 52 in server 14 for processing traps received from network elements 16. Method 200 begins at step 202 where alarm formatter 52 receives a trap from a particular network element 16. As described above, this trap may provide general information on network element 16, indicate a failure at various levels of severity (e.g., minor, major, critical), indicate a clear condition, indicate a module insertion event, or provide other status information on network element 16. The trap includes an object identifier, event code, timestamp, and trap sequence number ($TSN_E$). Alarm formatter 52 retrieves $TSN_E$ from the received trap at step 204.

At step 206, alarm formatter 52 determines whether $TSN_E$ is equal to an expected trap sequence number (the trap sequence number maintained in AC 60 ($TSN_{AC}$) incremented by one). If $TSN_E$ equals $TSN_{AC}$ incremented by one, then server 14 sets $TSN_{AC}$ and $TSN_D$ equal to $TSN_E$ at step 208 and proceeds to process the trap at step 210.

If $TSN_E$ is less than $TSN_{AC}$ incremented by one at step 212, alarm formatter 52 determines whether $TSN_E$ is in the missing trap list at step 213. If $TSN_E$ is not in the missing trap list, alarm formatter 52 performs a series of activities to recover from a trap sequence reset at step 215. Alarm formatter 52 clears the missing trap list, sets an alarm synchronization required flag (ASR) to false, removes missing trap timer 53, sets $TSN_{AC}$ equal to $TSN_E$, and processes the trap. After recovering from a trap sequence reset of network element 16, alarm formatter 52 invokes the alarm synchronization method, described below with reference to FIG. 7.

If a trap sequence reset did not occur at step 213, alarm formatter 52 deletes the trap number from the missing trap list in AC 60 at step 214. If the missing trap list includes more entries at step 216, then alarm formatter 52 proceeds to process the trap at step 210. If, however, there are no more traps in the missing trap list, then alarm formatter 52 resets and stops missing trap timer 53 at step 218 and sets $TSN_D$ equal to $TSN_{AC}$ decremented by one at step 220. If an alarm synchronization required flag (ASR) is not true at step 222, then alarm formatter 52 proceeds to process the trap at step 210. However, if ASR is true at step 222, then alarm formatter 52 sets ASR to false at step 224, processes the trap at step 226, and invokes the alarm synchronization process illustrated in FIG. 7.

If $TSN_E$ is not equal to $TSN_{AC}$ incremented by one (step 206) and $TSN_E$ is not less than $TSN_{AC}$ incremented by one (step 212), then alarm formatter 52 proceeds to step 230 and sets $TSN_{AC}$ equal to $TSN_E$. Alarm formatter 52 then adds all missing traps to the missing trap list at step 232. For example, if $TSN_E$ retrieved in step 204 is equal to 9 and $TSN_{AC}$ maintained in AC 58 is equal to 6, then alarm formatter 52 adds traps #7 and #8 to the missing trap list at step 232. Alarm formatter 52 then sets missing trap timer 53 at step 234 and proceeds to process the trap at step 210.

In a particular embodiment, alarm formatter 52 sets missing trap timer 53 to a time that will allow server 14 to recover from minor out-of-sequence trap events. However, if alarm formatter 52 receives out-of-sequence traps and is not within the time set in missing trap timer 53 to receive and delete missing traps from the missing trap list, then additional processing is performed as illustrated in FIG. 6.

Figure 6:
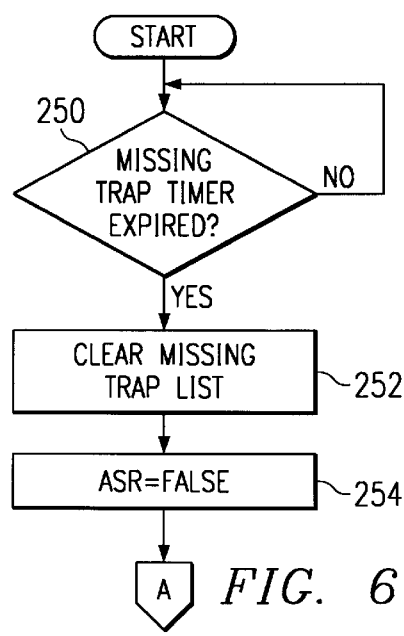
FIGS. 5 and 6 illustrate a flowchart of a method for processing traps in the network management system.

If missing trap timer 53 expires as determined in step 250 in FIG. 6, then alarm formatter 52 clears the missing trap list at step 252, sets the alarm synchronization required flag (ASR) to false, and invokes the configuration synchronization method 100 illustrated in FIGS. 3 and 4. By setting and resetting missing trap timer 53 and through maintenance of a missing trap list in AC 58, alarm formatter 52 is able to recover from minor out-of-sequence traps without performing configuration synchronization method 100. This allows for simple and efficient recovery from the transmission of out-of-sequence traps over management network 20.

Figure 7:
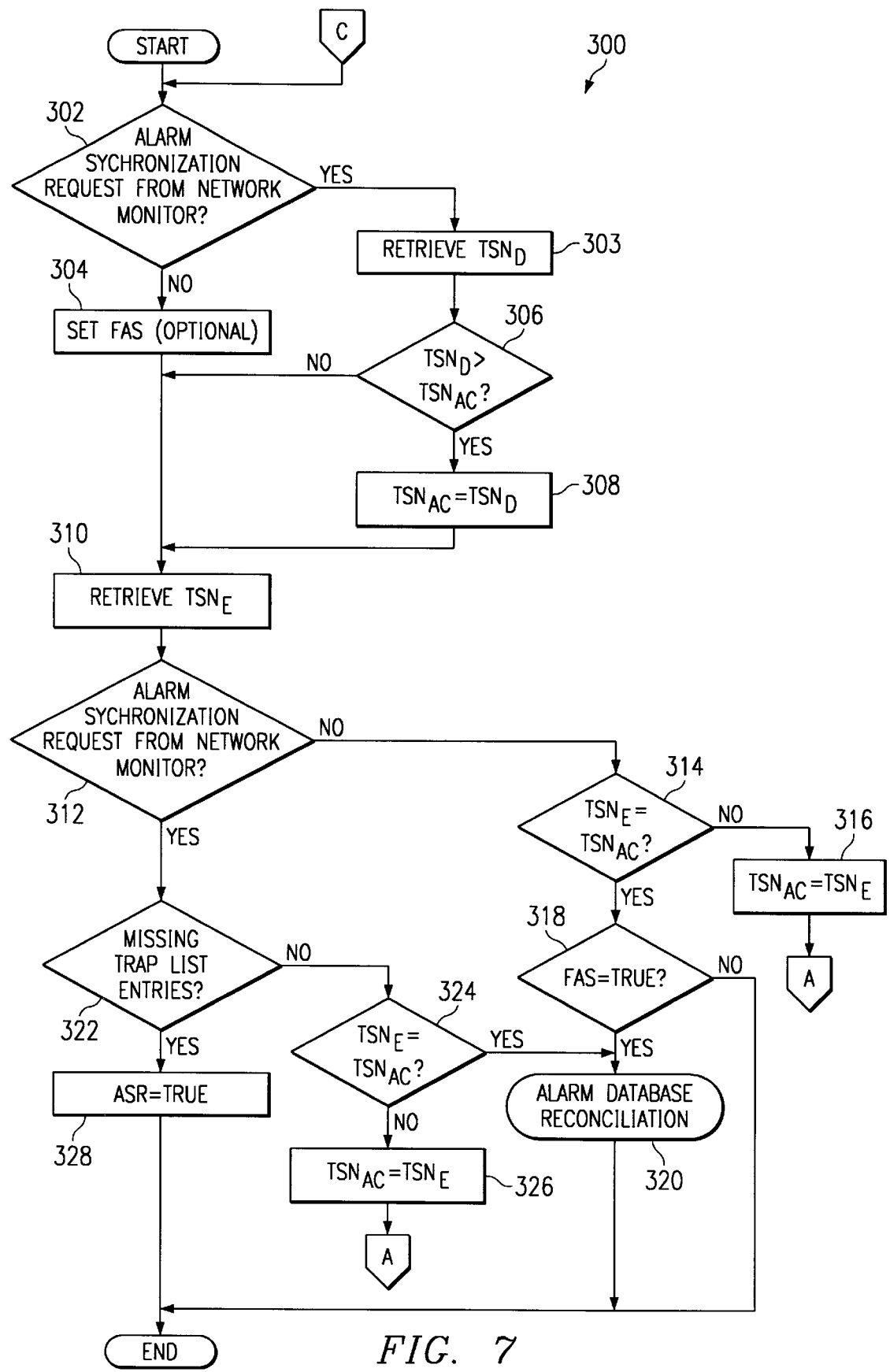
FIG. 7 is a flow chart of a method for synchronizing alarms in the network management system.

FIG. 7 illustrates a flowchart of a method 300 performed by alarm formatter 52 to synchronize alarms at server 14. Method 300 may be invoked periodically, by a user of client 12, upon detection of a trap sequence mismatch, or by network monitor 56. Method 300 begins at step 302 where alarm formatter 52 determines whether the alarm synchronization request is from network monitor 56. If the alarm synchronization request is not from network monitor 56, then server 14 may optionally set a forced alarm synchronization flag (FAS) at step 304. By setting FAS to true, method 300 guarantees to either perform an alarm synchronization or a configuration synchronization. In contrast if FAS is false and $TSN_E$ equals $TSN_{AC}$, no action to synchronize alarms will be taken.

If the alarm synchronization request is from network monitor 56 at step 302, then alarm formatter 52 retrieves the trap sequence number stored in database 32 ($TSN_D$) at step 303. Alarm formatter 52 then determines if $TSN_D$ is greater than $TSN_{AC}$ at step 306 and, if true, sets $TSN_{AC}$ to $TSN_D$ at step 308.

Alarm formatter 52 retrieves $TSN_E$ from network element 16 at step 310 and again determines whether the alarm synchronization request is from network monitor 56 at step 312. If it is not, then alarm formatter 52 determines whether $TSN_E$ equals $TSN_{AC}$ at step 314. If there is a mismatch, then alarm formatter 52 sets $TSN_{AC}$ equal to $TSN_E$ at step 316 and invokes configuration synchronization method 100.

If $TSN_E$ equals $TSN_{AC}$ at step 314, then alarm formatter 52 determines whether FAS is true at step 318. If FAS is false, then no action is performed by alarm formatter 52 and method 300 ends. However, if FAS is true at step 318, then alarm formatter 52 performs an alarm database reconciliation at step 320 to synchronize cache 30 and database 32 with configuration information maintained in MIB 24. To perform the alarm database reconciliation, server 14 reissues any missed alarms at step to establish the correct alarm state at database 32. Server 14 will determine the correct alarm state by reconciling the alarms stored in database 32 with the current alarm table stored in MIB 24 of network element 16. All alarms that are present in the current alarm table but not in database 32 will be reissued by server 14. All alarms that are present in database 32 but not in the current alarm table will be cleared from database 32. Server 14 will also inspect the module table in MIB 24 to determine if there are any new modules in network element 16 that are not in database 32.

If the alarm synchronization request is from network monitor 56 as determined at step 312, then alarm formatter 52 determines whether there are missing trap list entries at step 322. If the missing trap list is empty, then alarm formatter 52 determines whether $TSN_E$ equals $TSN_{AC}$ at step 324 and, if so, executes the alarm database reconciliation at step 320. If $TSN_E$ does not equal $TSN_{AC}$ at step 324, then alarm formatter 52 sets $TSN_{AC}$ equal to $TSN_E$ at step 326 and invokes configuration synchronization method 100. If the missing trap list includes entries at step 322, then alarm formatter 52 sets ASR equal to true at step 328, and method 300 ends.

Figure 8A:
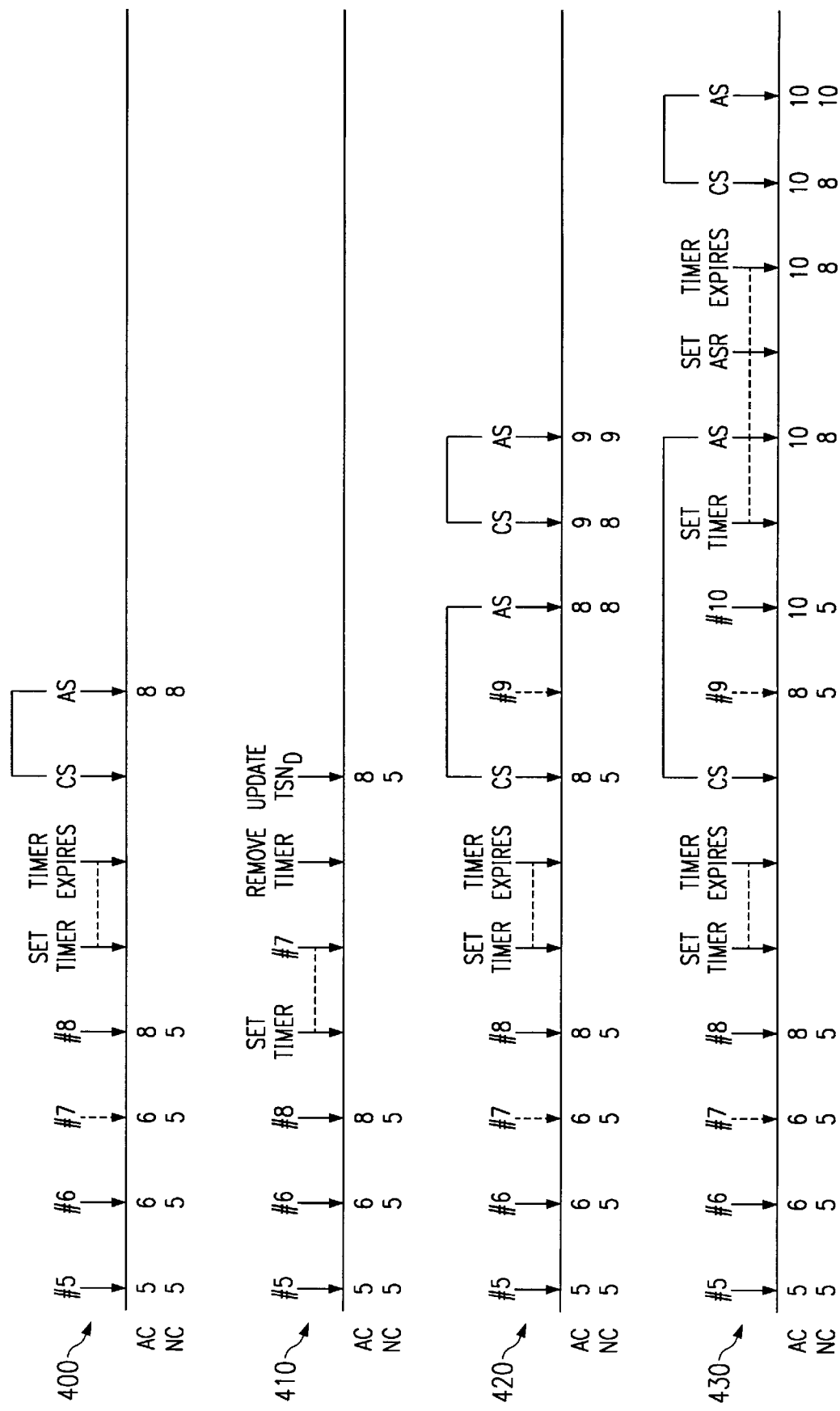

FIGS. 8A and 8B illustrate processes performed by alarm formatter 52 and network monitor 56 for a variety of different trap sequence scenarios. Each scenario illustrates a timeline of receiving traps, setting and removing missing trap timer 53, and invoking configuration synchronization (CS) in accordance with method 100 and alarm synchronization (AS) in accordance with method 300. Trap sequence numbers below each timeline indicate the current state of AC 58 and NC 60 maintained by alarm formatter 52 and network monitor 56, respectively. Database 32 provides a communication mechanism for resolving any inconsistencies between information stored in AC 58 and NC 60.

Referring to FIG. 8A, scenario 400 occurs when alarm formatter 52 misses a trap. Alarm formatter 52 successfully receives traps #5 and #6, but fails to receive trap #7 as indicated by the dashed line. Upon receiving trap #8, alarm formatter 52 detects an out-of-sequence condition and sets missing trap timer 53. Upon expiration of timer 53, alarm formatter 52 invokes a configuration synchronization by network monitor 56, which in turn invokes an alarm synchronization that reconciles the trap count in both AC 58 and NC 60.

Scenario 410 occurs when alarm formatter 52 receives traps out of sequence. Again, traps #5 and #6 are received without incident. Alarm formatter 52 then receives trap #8 out of sequence and, in response, sets missing trap timer 53. Prior to missing trap timer 53 expiring, alarm formatter 52 receives the missing trap #7, removes timer 53, and updates the trap sequence number maintained in database 32. Scenario 410 illustrates the advantage of maintaining timer 53 to recover from missing trap sequences without invoking a configuration synchronization or alarm synchronization.

Scenario 420 occurs when alarm formatter 52 misses a trap that arrives during the middle of a configuration synchronization. This scenario receives traps #5 through #8, expires the timer, and invokes a configuration synchronization much in the same manner as scenario 400. However, during configuration synchronization, trap #9 is sent but not received by alarm formatter 52. The alarm synchronization invoked by the first configuration synchronization updates both AC 58 and NC 60 with the current count of eight traps. Alarm formatter 52 realizing that $TSN_E$ does not match $TSN_{AC}$ invokes a second configuration synchronization followed by a second alarm synchronization to reconcile and account for missing trap #9.

Scenario 430 proceeds in a similar fashion as scenario 420, but alarm formatter 52 successfully receives trap #10 during the first configuration synchronization. Alarm formatter 52 then sets missing trap timer 53. At the completion of the configuration synchronization, an alarm synchronization is invoked. However, alarm formatter 52 realizes there are entries in the missing trap list, and does not perform an alarm synchronization but instead sets the ASR flag to true (step 328). Missing trap timer 53 expires, and alarm formatter 52 clears the missing trap list, resets the ASR flag, and invokes a second configuration synchronization. Network monitor 56 performs a second configuration synchronization, and alarm formatter 52 performs a second alarm synchronization to reconcile the trap count in AC 58 and NC 60. Even though two alarm synchronizations were invoked in scenario 430, the logic performed one alarm database reconciliation.

Referring to FIG. 8B, scenario 440 begins in a similar fashion as scenario 420 by missing trap #7 and setting and expiring missing trap timer 53. However, upon initiation of the configuration synchronization, alarm formatter 52 successfully receives traps #9 and #10, and updates database 32 with this information. As network monitor 56 finishes the configuration synchronization and initiates an alarm synchronization, it realizes that $TSN_D$ as updated by alarm formatter 52 to reflect receipt of traps #9 and #10 is greater than $TSN_{NC}$. Network monitor 56 updates NC 60 and alarm formatter 52 performs an alarm synchronization.

Scenario 450 occurs when network element 16 experiences downtime, failure, or other reset event, but the cold start trap generated by network element 16 upon reset is not received by server 14. This scenario receives traps #5 and #6 successfully before the occurrence of an equipment reset. After reset, trap #1 arrives at alarm formatter 52. Since $TSN_E$ is less than $TSN_{AC}$ and $TSN_E$ is not in the missing trap list, alarm formatter 52 invokes a configuration synchronization. Since $TSN_E$ is less than $TSN_D$, network monitor 56 sets TSU to true (step 105) and then performs a database reconciliation. Network monitor 56 then finishes the configuration synchronization, and since TSU is true (step 153) network monitor 56 sets $TSN_{NC}$ and $TSN_D$ equal to $TSN_E$. Network monitor 56 then invokes an alarm synchronization.

Scenario 460 proceeds in a similar fashion as scenario 450, but alarm formatter 52 successfully receives traps #2 and #3 during the configuration synchronization. Upon finishing the configuration synchronization, network monitor 56 sets $TSN_{NC}$ and $TSN_D$ equal to $TSN_E$ and invokes an alarm synchronization. Since $TSN_{AC}$ equals $TSN_E$, no further configuration synchronization will be invoked. The communication mechanism implemented by database 32 will synchronize $TSN_{AC}$ and $TSN_{NC}$ following the alarm synchronization.

For purposes of clarity, the above description of the configuration synchronization and alarm synchronization performed by server 14 was described with reference to synchronization of a single network element 16. However, server 14 may synchronize several network elements 16 in parallel. This is possible because each network monitor 56 in server 14 can communicate with and manage a subset of network elements 16. The number of network elements 16 managed by each network monitor 56 is user configurable, and the number of network elements 16 that may be synchronized in parallel is determined algorithmically, as discussed below.

Also, as part of the parallel synchronization features of server 14, there is a synchronization scheduling mechanism that provides a high and low level of priority for synchronization events. In a particular embodiment, the high level priority synchronization is reserved for synchronizations initiated by client 12 or other real-time activity, whereas low priority synchronization applies to network-wide synchronization requests. Each network monitor 56 will limit the number of low priority synchronizations that will be done in parallel and reserve the remaining openings for high priority requests.

For example, assume that network monitor 56 manages ten network elements, and that the maximum number of parallel synchronizations that may be performed by network monitor 56 is four, two high priority and two low priority. A network-wide synchronization request produces ten low priority synchronization requests for network monitor 56. In response, network monitor 56 performs two synchronizations in parallel in the low priority queues. When client 12 invokes a synchronization, a high priority synchronization would be placed in one of the remaining high priority queues immediately.

The maximum number of parallel synchronizations handled by a single running network monitor 56 (MaxRun) can be calculated as follows:

$$MaxRun = \min(MaxStore, MaxSys/(NetMons+1)).$$

where: MaxStore is the maximum parallel synchronizations allowed for a network monitor as determined by stored configuration information; MaxSys is the maximum system-wide parallel synchronizations allowed; and NetMons is the current number of running network monitors.

As noted in the algorithm, one is added to NetMons as an added buffer of safety to prevent system overload. As equipment is added to the system, MaxRun changes as NetMons increases. In addition, when server 14 starts a new network monitor 56, the process will only start performing synchronizations in parallel after the completion of the first synchronization. This will prevent a system overload as new network monitors 56 start up.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for updating a memory storing configuration information of a network element, comprising:

a network element operable to store configuration information; and a network manager coupled to the network element using a communication network, the network manager operable to store a portion of the configuration information in memory, the network manager further operable to receive a state variable from the network element and to compare the received state variable to a stored state variable, the network manager further operable to receive selected configuration information from the network element to update a selected part of the memory if the received state variable does not match the stored state variable.

2. The system of claim 1, wherein the network element comprises a digital subscriber line access multiplier.

3. The system of claim 1, wherein the memory comprises:

a database; and a cache coupled to the database, wherein the cache provides faster access to selected configuration information maintained in the database.

4. The system of claim 3, further comprising a client coupled to the network manager and operable to execute a graphical user interface to present configuration information stored in the cache to a human user.

5. The system of claim 1, wherein the configuration information comprises:

first configuration information specified by the network manager in a plurality of set requests communicated to the network element; and second configuration information autonomously generated by the network element in a plurality of traps.

6. The system of claim 1, wherein:

the configuration information comprises a plurality of traps; and the received state variable comprises a trap sequence number associated with a last trap generated by the network element.

7. The system of claim 6, wherein each trap identifies a selected one of an alarm, an alarm clear, or a module insertion event.

8. The system of claim 1, wherein:

the configuration information comprises a plurality of data subsets; and the network manager requests a particular data subset from the network element to update the selected part of the memory if a checksum stored in the memory and associated with the particular data subset does not match a corresponding checksum received from the network element.

9. The system of claim 1, wherein the state variable comprises a set request number indicating the number of times configuration information in the network element has been modified.

10. The system of claim 1, further comprising a second network manager operable to modify configuration information of the network element so that the memory maintained at the network manager does not reflect the modified configuration information.

11. A network manager, comprising:

a network interface operable to receive configuration information from a network element, the configuration information comprising at least one state variable;

a cache operable to store a subset of the configuration information; and a processor coupled to the network interface and the cache, the processor operable to compare the received state variable to a stored state variable, wherein the network manager receives selected configuration information from the network element to update a selected part of the cache if the received state variable does not match the stored state variable.

12. The network manager of claim 11, and further comprising a database operable to store configuration information of the network element, wherein the cache provides faster access to selected configuration information stored in the database.

13. The network manager of claim 11, further comprising a client operable to execute a graphical user interface to present configuration information stored in the cache to a human user.

14. The network manager of claim 11, wherein the network interface comprises:

a network monitor operable to poll the network element for configuration information; and an alarm formatter operable to receive configuration information autonomously generated by the network element in a plurality of traps.

15. The network manager of claim 11, wherein:

the configuration information comprises a plurality of traps; and the received state variable comprises a trap sequence number associated with a last trap generated by the network element.

16. The network manager of claim 15, wherein each trap identifies a selected one of an alarm, an alarm clear, or a module insertion event.

17. The network manager of claim 11, wherein:

the configuration information comprises a plurality of data subsets; and the processor receives a plurality of checksums associated with the data subsets; and the processor requests a particular data subset from the network element to update the selected part of the memory if the received checksum for the particular data subset does not match the stored checksum for the particular data subset.

18. The network manager of claim 11, wherein the state variable comprises a set request number indicating the number of times configuration information in the network element has been modified.

19. The network manager of claim 11, further comprising a second network manager operable to modify configuration information of the network element so that the memory does not reflect the modified configuration information.

20. A method for updating a memory storing configuration information of a network element, comprising:

storing, in a memory located remotely from the network element, a portion of configuration information maintained by a network element;

receiving a first state variable from the network element;

receiving a second state variable from the memory; and receiving selected configuration information from the network element to update a selected part of the memory if the first state variable does not match the second state variable.

21. The method of claim 20, wherein the memory comprises a database and a cache coupled to the database, and further comprising the step of providing faster access to selected configuration information maintained in the database using the cache.

22. The method of claim 21, further comprising a client coupled to the network manager and operable to execute a graphical user interface to present configuration information stored in the cache to a human user.

23. The method of claim 20, wherein the network element comprises a digital subscriber line access multiplier.

24. The method of claim 20, wherein the configuration information maintained by the network element comprises:
first configuration information specified by a network manager in a plurality of set requests communicated to the network element; and
second configuration information autonomously generated by the network element in a plurality of traps.

25. The method of claim 20, wherein:
the configuration information comprises a plurality of traps; and
the first state variable comprises a trap sequence number associated with a last trap generated by the network element.

26. The method of claim 25, wherein each trap identifies a selected one of an alarm, an alarm clear, or a module insertion event.

27. The method of claim 20, wherein the configuration information comprises a plurality of data subsets, and further comprising:
receiving a first checksum associated with a particular data subset from the network element;
receiving a second checksum from the memory; and
requesting the particular data subset from the network element to update the selected part of the memory if the first checksum does not match the second checksum.

28. The method of claim 20, wherein the state variable comprises a set request number indicating the number of times configuration information in the network element has been modified.

29. The method of claim 20, further comprising a second network manager operable to modify configuration information of the network element so that the memory maintained at the network manager does not reflect the modified configuration information.

* * * * *